United States Patent
Lockwood et al.

(10) Patent No.: US 7,666,244 B2
(45) Date of Patent: Feb. 23, 2010

(54) HARDFACING MILLED-TOOTH DRILL BITS USING SUPER DENSE CARBIDE PELLETS

(75) Inventors: Gregory T. Lockwood, Pearland, TX (US); Anthony Griffo, The Woodlands, TX (US); Dah-Ben Liang, Kingwood, TX (US); Alysia C. White, Fulshear, TX (US)

(73) Assignee: Smith International, Inc., Houston, TX (US)

( * ) Notice: Subject to any disclaimer, the term of this patent is extended or adjusted under 35 U.S.C. 154(b) by 376 days.

(21) Appl. No.: 11/175,120

(22) Filed: Jul. 5, 2005

(65) Prior Publication Data

US 2006/0005662 A1    Jan. 12, 2006

Related U.S. Application Data

(60) Provisional application No. 60/586,258, filed on Jul. 8, 2004.

(51) Int. Cl.
*C22C 29/08* (2006.01)
*E21B 10/50* (2006.01)

(52) U.S. Cl. .................... 75/240; 175/374; 175/375; 175/425

(58) Field of Classification Search .......... 75/240; 51/295; 175/374, 426, 375, 425
See application file for complete search history.

(56) References Cited

U.S. PATENT DOCUMENTS

| | | | |
|---|---|---|---|
| 5,250,355 A | | 10/1993 | Newman et al. |
| 5,653,299 A | * | 8/1997 | Sreshta et al. ............. 175/374 |
| 5,791,422 A | * | 8/1998 | Liang et al. ............... 175/374 |
| 5,921,330 A | * | 7/1999 | Sue et al. .................. 175/374 |
| 5,944,127 A | * | 8/1999 | Liang et al. ............... 175/374 |
| 6,361,739 B1 | * | 3/2002 | Sreshta et al. ............... 419/68 |
| 6,440,358 B1 | * | 8/2002 | Sreshta et al. ............... 419/66 |
| 6,663,688 B2 | * | 12/2003 | Findeisen et al. ........... 75/252 |
| 2003/0000339 A1 | | 1/2003 | Findeisen et al. |
| 2003/0079565 A1 | * | 5/2003 | Liang et al. ................. 75/240 |

* cited by examiner

*Primary Examiner*—Roy King
*Assistant Examiner*—Ngoclan T Mai
(74) *Attorney, Agent, or Firm*—Osha • Liang LLP (57) ABSTRACT

A hardfacing composition for a drill bit, including a carbide phase comprising from about 50% to about 75% by weight of the hardfacing composition of a combination of 16 to 40 mesh cemented tungsten carbide and 80 to 200 mesh super dense tungsten carbide cobalt particles, wherein about 5% to about 50% by weight of the carbide phase comprises the super dense tungsten carbide cobalt particles, and a binder alloy including about 25% to about 50% by weight of the hardfacing composition.

20 Claims, 3 Drawing Sheets

Prior art particles – dissolved. HMIC2-S2 test rod.

Fig 4

Welded at Smith. HMIC2 type with small dense particles replacing cast carbide. Spherical shape intact.

HARDFACING MILLED-TOOTH DRILL BITS USING SUPER DENSE CARBIDE PELLETS

CROSS-REFERENCE TO RELATED APPLICATIONS

This application claims priority, pursuant to 35 U.S.C. § 119(e), of U.S. Provisional Application Ser. No. 60/586,258 filed on Jul. 8, 2004.

BACKGROUND OF INVENTION

1. Field of the Invention

The invention relates generally to hardfacing compositions. More specifically, the present invention relates to hardfacing compositions for use on milled tooth drill bits.

2. Background Art

Drill bits used to drill wellbores through earth formations generally are made within one of two broad categories of bit structures. Drill bits in the first category are generally known as "fixed cutter" or "drag" bits, which usually include a bit body formed from steel or another high strength material and a plurality of cutting elements disposed at selected positions about the bit body. The cutting elements may be formed from any one or combination of hard or superhard materials, including, for example, natural or synthetic diamond, boron nitride, and tungsten carbide.

Drill bits of the second category are typically referred to as "roller cone" bits, which include a bit body having one or more roller cones rotatably mounted to the bit body. The bit body is typically formed from steel or another high strength material. The roller cones are also typically formed from steel or other high strength material and include a plurality of cutting elements disposed at selected positions about the cones. The cutting elements may be formed from the same base material as is the cone. These bits are typically referred to as "milled tooth" bits. Other roller cone bits include "insert" cutting elements that are press (interference) fit into holes formed and/or machined into the roller cones. The inserts may be formed from, for example, tungsten carbide, natural or synthetic diamond, boron nitride, or any one or combination of hard or superhard materials.

Milled tooth bits include one or more roller cones rotatably mounted to a bit body. The one or more roller cones are typically made from steel and include a plurality of teeth formed integrally with the material from which the roller cones are made. Typically, a hardfacing material is applied, such as by arc or gas welding, to the exterior surface of the teeth to improve the wear resistance of the teeth. The hardfacing material typically includes one or more metal carbides, which are bonded to the steel teeth by a metal alloy ("binder alloy"). In effect, the carbide particles are suspended in a matrix of metal forming a layer on the surface. The carbide particles give the hardfacing material hardness and wear resistance, while the matrix metal provides fracture toughness to the hardfacing.

Many factors affect the durability of a hardfacing composition in a particular application. These factors include the chemical composition and physical structure (size and shape) of the carbides, the chemical composition and microstructure of the matrix metal or alloy, and the relative proportions of the carbide materials to one another and to the matrix metal or alloy.

The metal carbide most commonly used in hardfacing is tungsten carbide. Small amounts of tantalum carbide and titanium carbide may also be present in such material, although these other carbides are considered to be deleterious. It is quite common to refer to the material in the hardfacing merely as "carbide" without characterizing it as tungsten carbide. It should be understood that as used herein, "carbide" generally refers to tungsten carbide.

Many different types of tungsten carbides are known based on their different chemical compositions and physical structure. Three types of tungsten carbide commonly used in hardfacing drill bits are cast tungsten carbide, macro-crystalline tungsten carbide, and cemented tungsten carbide (also known as sintered tungsten carbide), the most common among these being crushed cast carbide.

Tungsten generally forms two carbides, monotungsten carbide (WC) and ditungsten carbide ($W_2C$). Tungsten carbide may also exist as a mixture of these two forms with any proportion between the two. Cast carbide is a eutectic mixture of the WC and $W_2C$ compounds, and as such the carbon content in cast carbide is sub-stoichiometric, (i.e., it has less carbon than the more desirable WC form of tungsten carbide). Cast carbide is prepared by freezing carbide from a molten state and crushing and comminuting the resultant particles to the desired particle size.

Macro-crystalline tungsten carbide is essentially stoichiometric WC in the form of single crystals. While most of the macro-crystalline tungsten carbide is in the form of single crystals, some bicrystals of WC are found in larger particles. Macro-crystalline WC is a desirable hardfacing material because of its erosion resistance and stability.

The third type of tungsten carbide used in hardfacing is cemented tungsten carbide, also known as sintered tungsten carbide. Cemented tungsten carbide comprises small particles of tungsten carbide (e.g., 1 to 15 microns) bonded together with cobalt. Cemented tungsten carbide is produced by mixing organic wax, tungsten carbide and cobalt powders, pressing the mixed powders to form a green compact, and "sintering" the composite at temperatures near the melting point of cobalt. The resulting dense cemented carbide can then be crushed and comminuted to form particles of cemented tungsten carbide for use in hardfacing.

As mentioned above, conventional hardfacing of milled-tooth bits usually comprises particles of tungsten carbide that are bonded to the steel teeth using a metal alloy. Most hardfacing on rock bits uses steel as the matrix (base), although other alloys may also be used. Steel or other alloys will generally be referred to as a binder alloy, and hardfacing compositions are typically applied from tube rods as disclosed in, for example, U.S. Pat. No. 5,250,355 issued to Newman et al.

More specifically, conventional hardfacing of milled-toothed bits usually include spherical cemented tungsten carbide particles larger than 60 mesh (e.g., greater than approximately 250 µm). The term "mesh" generally refers to the size of the wire mesh used to screen the carbide particles. For example, "60 mesh" indicates a wire mesh screen with sixty holes per linear inch, where the holes are defined by the crisscrossing strands of wire in the mesh. The hole size is determined by the number of meshes per inch and the wire size. The mesh sizes referred to herein are standard U.S. mesh sizes.

However, by using such large mesh sizes, "gaps" are left between the particles. As will be appreciated by those having ordinary skill, the larger the spherical particle, the larger the gap between particles. In order to provide sufficiently wear resistant compounds, a filler such as cast tungsten carbide or macrocrystalline tungsten carbide is typically used to fill the gaps between the larger spherical cemented tungsten carbide particles. In some cases, smaller spherical cemented carbide particles (e.g., less than 60 mesh) are also used to fill the gaps between then larger spherical cemented carbide particles. However, smaller tungsten carbide particles tend to break apart and dissolve into the steel matrix when exposed to welding temperatures. Even larger particles of 16 to 20 mesh can break apart during welding or the outer layers can dissolve.

A typical technique for applying hardfacing to the teeth on a rock bit is by oxyacetylene or atomic hydrogen welding. A welding "rod" or stick is typically formed as a tube of mild steel sheet enclosing a filler that mainly comprises carbide particles. The filler may also include deoxidizer for the steel, flux and a resin binder. The hardfacing is applied by melting an end of the rod on the face of the tooth. The steel tube melts as it is welded to the steel tooth and provides the matrix for the carbide particles. The deoxidizer alloys with the mild steel of the tube.

Although mild steel sheet is used when forming the tubes, the steel in the hardfacing on a finished a rock bit is a hard, wear resistant alloy steel. The conversion from a mild steel to the hard, wear resistant alloy steel occurs when the deoxidizers (which contain silicon and manganese) in the filler and tungsten, carbon, and possibly cobalt, from the tungsten carbide dissolve and mix with the steel during welding. There may also be some mixing with alloy steel from the teeth on the cone.

Advances in wear resistance of hardfacing are desirable to enhance the footage a drill bit can drill before becoming dull, and to enhance the rate of penetration of such drill bits. Such improvements translate directly into a reduction of drilling expenses. The composition of a hardfacing material and the physical structure of the hardfacing material applied to the surfaces of a drill bit are related to the degree of wear resistance and toughness. It is desirable to have a composition of hardfacing material that, when applied to wear surfaces, provides improved wear resistance and toughness while remaining relatively simple to apply to teeth.

SUMMARY OF INVENTION

In general, in one aspect, the invention relates to a hardfacing composition for a drill bit, comprising a carbide phase comprising from about 50% to about 75% by weight of the hardfacing composition of a combination of 16 to 40 mesh cemented tungsten carbide and 80 to 200 mesh super dense tungsten carbide cobalt particles, wherein about 5% to about 50% by weight of the carbide phase comprises the super dense tungsten carbide cobalt particles, and a binder alloy comprising about 25% to about 75% by weight of the hardfacing composition.

In general, in one aspect, the invention relates to a roller cone drill bit, comprising a bit body, and at least one roller cone rotatably mounted to the bit body, the at least one roller cone comprising at least one cutting element, the at least one cutting element having a hardfacing composition on at least an exterior surface, the hardfacing composition comprising a carbide phase comprising from about 50% to about 75% by weight of the hardfacing composition of a combination of 16 to 40 mesh cemented tungsten carbide and 80 to 200 mesh super dense tungsten carbide cobalt particles, wherein about 5% to about 50% by weight of the carbide phase comprises the super dense tungsten carbide cobalt particles, and a binder alloy comprising about 25% to about 75% by weight of the hardfacing composition.

In general, in one aspect, the invention relates to a hardfacing composition for a drill bit, comprising a carbide phase comprising from about 50% to about 75% by weight of the hardfacing composition of a combination of 16 to 40 mesh cemented tungsten carbide and 80 to 200 mesh super dense tungsten carbide cobalt particles, wherein about 5% to about 50% by weight of the carbide phase comprises the super dense tungsten carbide cobalt particles.

In general, in one aspect, the invention relates to a roller cone drill bit, comprising a bit body, and at least one roller cone rotatably mounted to the bit body, the at least one roller cone comprising at least one cutting element, the at least one cutting element having hardfacing composition on at least an exterior surface, the hardfacing composition comprising a carbide phase comprising from about 50% to about 75% by weight of the hardfacing composition of a combination of 16 to 40 mesh cemented tungsten carbide and 80 to 200 mesh super dense tungsten carbide cobalt particles, wherein about 5% to about 50% by weight of the carbide phase comprises the super dense tungsten carbide cobalt particles.

In general, in one aspect, the invention relates to a method for forming a drill bit comprising applying a hardfacing to at least one of a plurality of teeth in the drill bit wherein the hardfacing comprises a carbide phase comprising from about 50% to about 75% by weight of the hardfacing composition of a combination of 16 to 40 mesh cemented tungsten carbide and 80 to 200 mesh super dense tungsten carbide cobalt particles, wherein about 5% to about 50% by weight of the carbide phase comprises the super dense tungsten carbide cobalt particles.

Other aspects of the invention will be apparent from the following description and the appended claims.

DETAILED DESCRIPTION

The present invention relates to hardfacing compositions which use super dense tungsten carbide cobalt particles ("DS particles") in combination with spherical cemented tungsten carbide particles. DS particles is the name given to a class of sintered particles as disclosed in U.S. Patent Publication No. 2003/0000339. The DS particles are of substantially spheroidal shape and have a predominantly closed porosity or are free of pores. The process for producing such particles starts from a powder material with a partially porous internal structure, which is introduced into a furnace and sintered at a temperature at which the material of the metallic binder adopts a pasty state while applying pressure to reduce the pore content of the starting material.

The DS particles have been found to retain their spherical shape after exposure to high temperatures, such as those experienced during the welding process to produce the hardfacing. Surprisingly, the present inventors have discovered that by appropriately selecting combinations of materials, a hardfacing composition can be formed that significantly improves wear and erosion resistance, and increase hardness of the milled-tooth bit. DS particles having a selected grain size (typically on the order of 80 to 400 mesh) are incorporated into the hardfacing composition and serve as a "filler," instead of the traditionally used cast or macrocrystalline carbides described above. Because the DS particles retain their spherical shape, they are able to provide additional toughness (crack propagation) and wear resistance characteristics, which are not provided by the prior art cast and macrocrystalline carbide fillers.

In particular, the present invention relates to hardfacing compositions and/or matrix materials for use in PDC bits. It should be understood that while the below description relates to hardfacing compositions for roller cone bits, embodiments of the present invention may be used in other applications as well. In particular, embodiments of the present invention are useful as matrix materials in PDC bits. Those having ordinary skill in the art will appreciate this and other uses that are expressly within the scope of the present invention.

An example of a milled tooth roller cone drill bit includes a steel body 10 having a threaded coupling ("pin") 11 at one end for connection to a conventional drill string (not shown). At the opposite end of the drill bit body 10, there are three roller cones 12 for drilling earth formations to form an oil well or the like ("wellbore"). Each of the roller cones 12 is rotatably mounted on a journal pin (not shown in FIG. 1) extending diagonally inwardly on each one of the three legs 13 extending downwardly from the bit body 10. As the bit is rotated by the drill string (not shown) to which it is attached, the roller cones 12 effectively roll on the bottom of the wellbore being drilled.

Figure 1:
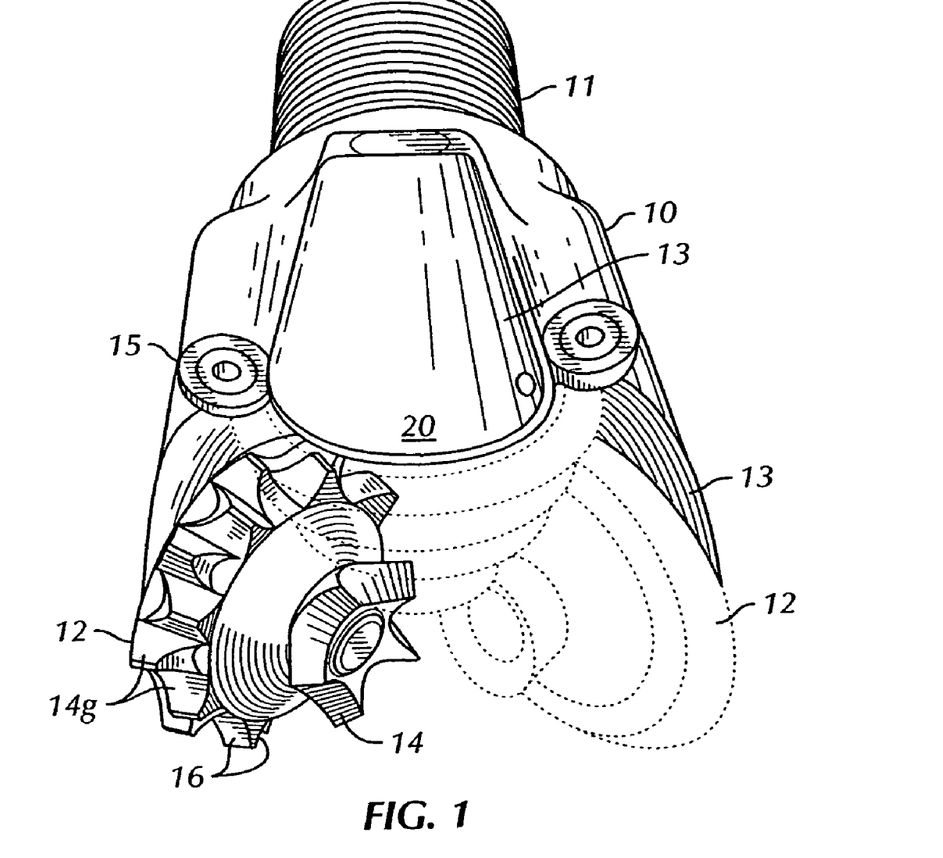
FIG. 1 shows an example of a milled tooth roller cone rock bit.

The roller cones 12 are shaped and mounted so that as they roll, teeth 14 on the cones 12 gouge, chip, crush, abrade, and/or erode the earth formations (not shown) at the bottom of the wellbore. The teeth 14G in the row around the heel of the cone 12 are referred to as the "gage row" teeth. They engage the bottom of the hole being drilled near its perimeter or "gage." Fluid nozzles 15 direct drilling fluid ("mud") into the hole to carry away the particles of formation created by the drilling.

Such a roller cone rock bit as shown in FIG. 1 is conventional and is therefore merely one example of various arrangements that may be used in a rock bit which is made according to the invention. For example, most roller cone rock bits have three roller cones as illustrated in FIG. 1. However, one, two and four roller cone drill bits are also known in the art. Therefore, the number of such roller cones on a drill bit is not intended to be a limitation on the scope of the invention.

The arrangement of the teeth 14 on the cones 12 shown in FIG. 1 is just one of many possible variations. In fact, it is typical that the teeth on the three cones on a rock bit differ from each other so that different portions of the bottom of the hole are engaged by each of the three roller cones so that collectively the entire bottom of the hole is drilled. A broad variety of tooth and cone geometries are known and do not form a specific part of this invention, nor should the invention be limited in scope by any such arrangement.

Figure 2:
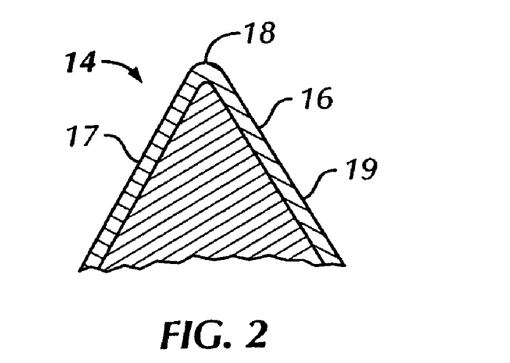
FIG. 2 shows a cross-section of an example of a milled tooth.

The example teeth on the roller cones shown in FIG. 1 are generally triangular in a cross-section taken in a radial plane of the cone. Referring to FIG. 2, such a tooth 14 has a leading flank 16 and a trailing flank 17 meeting in an elongated crest 18. The flank of the tooth 14 is covered with a hardfacing layer 19. Sometimes only the leading face of each such tooth 14 is covered with a hardfacing layer so that differential erosion between the wear-resistant hardfacing on the front flank of a tooth and the less wear-resistant steel on the trailing face of the tooth tends to keep the crest of the tooth relatively sharp for enhanced penetration of the rock being drilled.

The leading flank 16 of the tooth 14 is the face that tends to bear against the undrilled rock as the rock bit is rotated in the wellbore. Because of the various cone angles of different teeth on a roller cone relative to the angle of the journal pin on which each cone is mounted, the leading flank on the teeth in one row on the same cone may face in the direction of rotation of the bit, whereas the leading flank on teeth in another row may on the same cone face away from the direction of rotation of the fit. In other cases, particularly near the axis of the bit, neither flank can be uniformly regarded as the leading flank and both flanks may be provided with a hardfacing. In some drill bits, hardfacing may be applied on the shirttail (20 in FIG. 1) at the bottom of each leg on the bit body.

There are also times when the ends of a tooth, that is, the portions facing in more or less an axial direction on the cone, are also provided with a layer of hardfacing. This is particularly true on the gage surface of the bit which is often provided with a hardfacing. The gage surface is a generally conical surface at the heel of a cone which engages the side wall of a hole as the bit is used. The gage surface includes the outer end of teeth in the gage row of teeth nearest the heel of the cone and may include additional area nearer the axis of the cone between the teeth. The gage surface is not considered to include the leading and trailing flanks of the gage row teeth. The gage surface encounters the side wall of the hole in a complex scraping motion which induces wear of the gage surface.

As noted above, certain embodiments of the present invention relate to the compositions of hardfacing materials for application to rock bits, including milled tooth cutter cones. The hardfacing materials according to the invention comprises DS particles and spherical cemented tungsten carbide particles. When these materials are applied to drill bits, the carbide phase (including both the DS particles and the cemented tungsten carbide particles) are generally suspended in a matrix of alloy steel welded to the drill bits.

The hardfacing layer may be applied to the teeth and/or shirttail using processes well known in the art. One such process is atomic hydrogen welding. Another process is oxyacetylene welding. Other processes include plasma transferred arc ("PTA"), gas tungsten arc, and shield metal arc processes, among other thermal deposition processes. In oxyacetylene welding, for example, the hardfacing material is typically supplied in the form of a tube or hollow rod ("a welding tube") that is filled with granular material of a selected composition. The tube is usually made of steel (iron) or a similar metal (e.g., nickel or cobalt) that can act as a binder when the rod and its granular contents are heated.

The tube thickness is selected so that its metal forms a selected fraction of the total composition of the hardfacing material that is applied to the drill bit. The granular filler of the rod or tube typically includes various forms of metal carbides (e.g., tungsten, molybdenum, tantalum, niobium, chromium, and vanadium carbides), and, most typically, various forms of tungsten carbide. Alternatively, the binder alloy may be in the form of a wire ("a welding wire") wherein the hardfacing materials are coated on the wire using resin binders. With a PTA welding process, the hardfacing materials may be supplied in the form of a welding tube, a welding wire, or a powder, although the powder form is preferred.

In addition to the carbide in the tube filler, it is desirable to include up to five percent by weight of deoxidizer and a temporary resin binder. A suitable deoxidizer includes silicomanganese obtained from Chemalloy in Bryn Mawr, Pa. A typical composition of the silicomanganese is 65% to 68% manganese, 15% to 18% silicon, a maximum of 2% carbon, a maximum of 0.05% sulfur, a maximum of 0.35% phosphorus, and a balance comprising iron. Preferably, about four percent deoxidizer is used. A small amount of thermoset resin is desirable for partially holding the particles together in the tube so that they do not simply fall out during welding. A half percent by weight of resin is adequate. The term "deoxidizer" as used herein refers generally to deoxidizer with or without the resin.

The proportion of filler ("carbide phase") to the steel tube ("binder alloy") in embodiments of the invention comprises about 60 to 70 carbide phase and about 30 to 40 binder alloy. All percentages given are pre-application ratios. The proportions can be controlled, for example, by using steel tubes of different thickness and diameter. For example, to obtain a 70:30 weight ratio of filler to steel, a 5/32 inch (4 mm) diameter tube is made with steel having a wall thickness of 0.017 inch (0.43 mm). Alternatively, a 3/16 inch (4.5 mm) diameter steel tube with a wall 0.02 inch (0.5 mm) thick will produce roughly the same weight ratio.

According to some embodiments of the present invention, the DS particles are about 94% by weight tungsten carbide and about 6% by weight cobalt. The particles have two distinct size distribution ranges of about 20-180 µm (spray dried) or 325-1100 µm (rolled to size), with an average hardness of about 1850 KHN (measured on the Knoop hardness scale). Further, within the DS particles, the tungsten carbide grain size is approximately 2-4 µm. The DS particles are commercially available from WOKA GmbH (Barchfeld, Germany).

According to some embodiments of the present invention, compositions of the hardfacing materials include spherical cemented carbide having a particle size in the range of about 16 to 40 ASTM Mesh, and DS particles having a particle size of about 80 to 200 mesh ASTM Mesh. In some embodiments of the invention, the carbide phase of the hardfacing composition makes up from about 50% to about 75%, preferably from about 64% to about 68%, by weight of the total hardfacing composition. Of the total carbide phase, about 10% to 60% of the total weight of the carbide phase comprises the DS particles.

More preferably, the DS particles represent 10% to 25% of the total weight of the carbide phase. The remainder of the composition includes binder alloy that, as explained above, can be in the form of metal in the welding tube or rod or in powder form if welding process such as PTA are used. Moreover, the binder alloy may include a deoxidizer/resin of a type known in the art. Typically, the deoxidizer/resin will form no more than about 5%, preferably about 4%, by weight of the total hardfacing composition.

Further, in some embodiments of the invention, the DS particles may be combined with cast tungsten carbide, carburized tungsten carbide, and/or macro-crystalline tungsten carbide to produce hardfacing materials that have increased wear resistance and hardness.

In one embodiment of the invention, the material used for hardfacing milled-tooth bits is 67% by weight carbine and resin filler and 33% by weight steel. Further, the 67% by weight carbine and resin filler may have the following composition as outlined in Table 1 below.

TABLE 1

Composition of Carbine and Resin Filler Portion

| Specific Carbide Type | Mesh Size | Weight Percent |
|---|---|---|
| Spherical Cemented Carbide Pellets | 16-20 | 40 |
| Spherical Cemented Carbide Pellets | 30-40 | 28 |
| Crushed Cast Tungsten Carbide | 40-80 | 8 |
| DS Spherical Cemented Carbide Particles | 80-200 | 10 |
| Carburized Tungsten Carbide | 325-400 | 10 |
| Deoxidizer and Resin | n/a | 4 |

Figure 3:
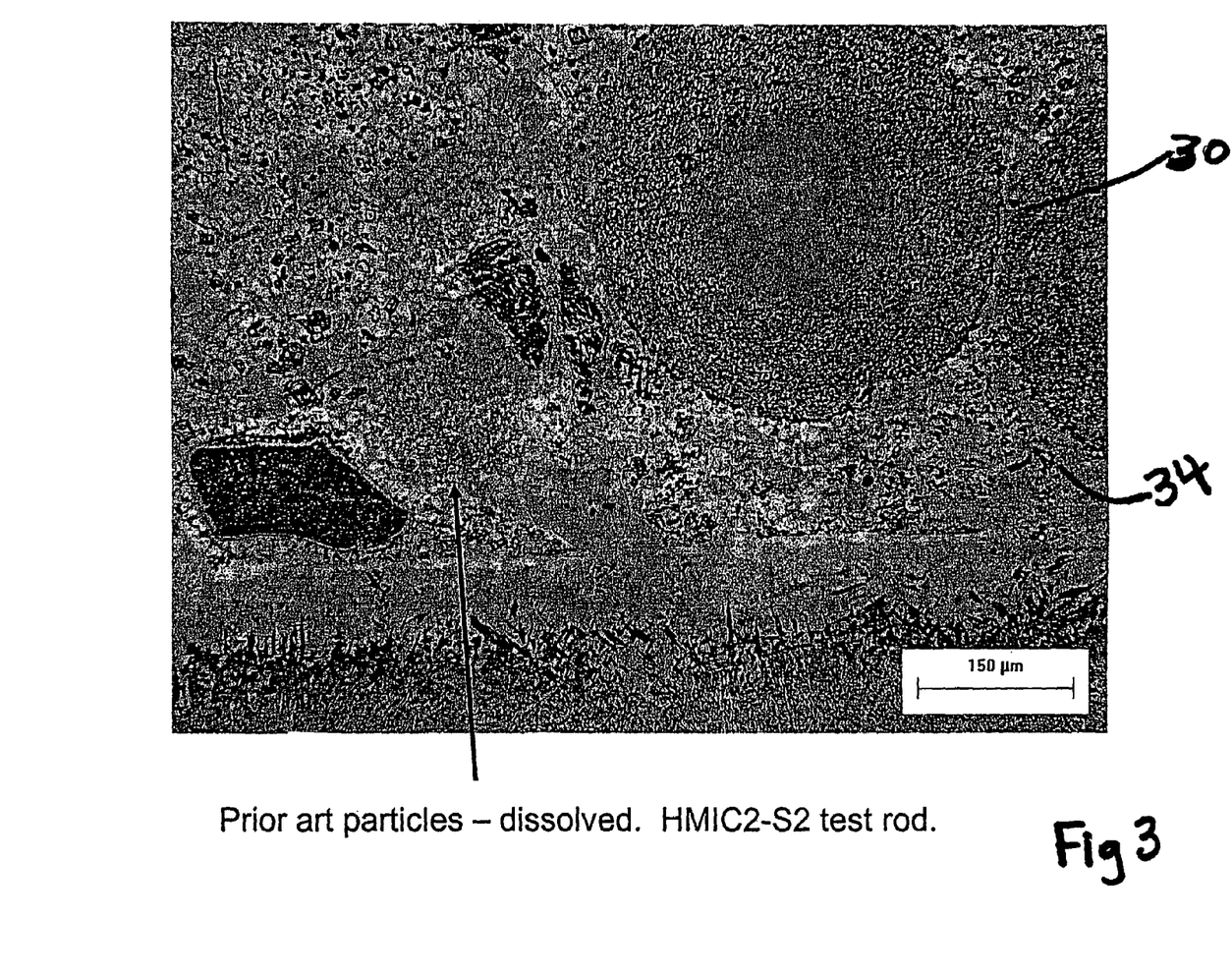
FIG. 3 shows conventional hardfacing material after exposure to high temperatures at high magnification.

The present invention may have one or more of the following advantages. One of the properties of the DS particles is that they retain their spherical shape after expose to high temperatures, such as those used in welding. FIG. 3 shows conventional hardfacing material after exposure to high temperatures at high magnification. Specifically, while the cemented tungsten carbide particles (30) retain their spherical shape when exposed to high temperatures such as those present in the welding process, the smaller cast carbide particles (32) used to fill the gaps between the larger cemented tungsten carbide particles, (30) do not retain their spherical shape. Rather, the smaller cast carbide particles (32) tend to break apart and dissolve into the steel matrix (34) of the hardfacing material, thus decreasing the toughness of the steel matrix.

Figure 4:
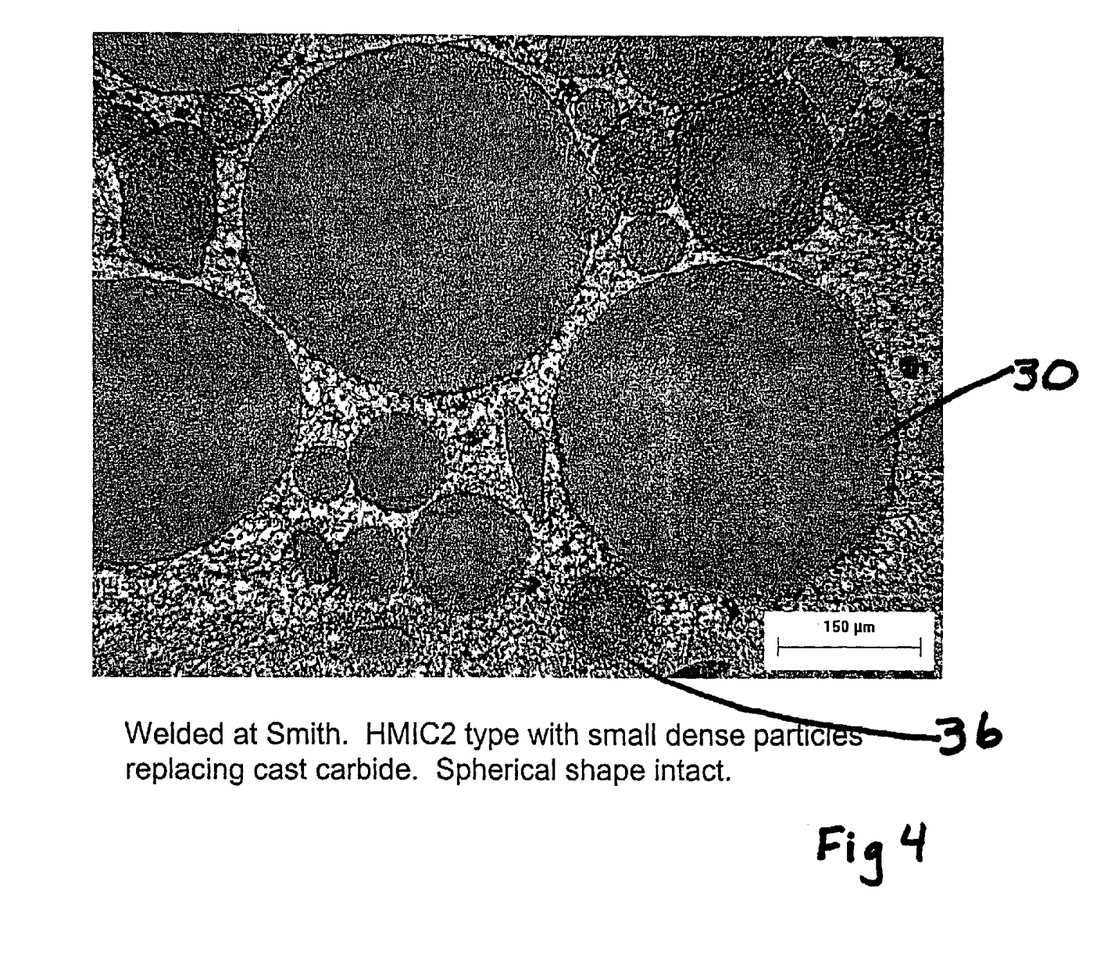
FIG. 4 shows hardfacing material after exposure to high temperatures in accordance with one embodiment of the invention.

In contrast, when the smaller cast carbide particles are replaced with DS particles, the DS particles tend to retain their spherical shape when exposed to high temperatures, such as those present in the welding process. The resulting hardfacing is generally harder and has better wear resistance. Further, the resulting hardfacing materials tend to be less brittle as compared to the prior art materials. This is because macro-crystalline carbide and carburized WC are prone to cracking compared to cemented carbide materials (WC cemented by cobalt). FIG. 4 shows hardfacing material after exposure to high temperatures in accordance with one embodiment of the invention. As shown in FIG. 4, the cemented tungsten carbide particles (30) retain their spherical shape and, in addition, the smaller DS particles (36) used to fill the gaps between the larger cemented tungsten carbide particles (30) also retain their spherical shape.

In general, one or more embodiments of the invention may provide one or more of the following advantages. In one embodiment of the invention, the incorporation of DS particles provides a more desirable microstructure in the hardfacing material. Further, hardfacing materials incorporating DS particles increase wear resistance of the hardfacing material due to more desirable porosity in the resulting hardfacing material, as well as an increase in hardness of the resulting hardfacing material, and a reduction in the number of voids in the resulting hardfacing material. Along with mechanical property improvements, the DS particles are less susceptible to WC grains dissolving into steel matrix thereby preventing molten metal from penetrating and altering the DS shape during welding.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A welded hardfacing composition for a drill bit, comprising:
    a carbide phase comprising from about 50% to about 75% by weight of the welded hardfacing composition, and wherein the carbide phase comprises a combination of 16 to 40 mesh cemented tungsten carbide, 40 to 80 mesh crushed cast tungsten carbide, 325 to 400 mesh carburized tungsten carbide, and 80 to 200 mesh super dense tungsten carbide cobalt particles, wherein about 5% to about 50% by weight of the carbide phase comprises the super dense tungsten carbide cobalt particles; and
    a binder alloy comprising about 25% to about 50% by weight of the welded hardfacing composition.

2. The welded hardfacing composition as defined in claim 1, wherein the carbide phase forms from about 64% to about 68% by weight of the welded hardfacing composition.

3. The welded hardfacing composition as defined in claim 1, further comprising a deoxidizer in an amount of at most about 5% by weight of the welded hardfacing composition.

4. The welded hardfacing composition as defined in claim 1, wherein the super dense tungsten carbide cobalt particles comprises about 10% to about 25% by weight of the carbide phase.

5. A roller cone drill bit, comprising:
a bit body; and
at least one roller cone rotatably mounted to the bit body, the at least one roller cone comprising at least one cutting element, the at least one cutting element having a welded hardfacing composition welded on at least an exterior surface, the welded hardfacing composition comprising:
a carbide phase comprising from about 50% to about 75% by weight of the welded hardfacing composition, and wherein the carbide phase comprises a combination of 16 to 40 mesh cemented tungsten carbide, 40 to 80 mesh crushed cast tungsten carbide, 325 to 400 mesh carburized tungsten carbide, and 80 to 200 mesh super dense tungsten carbide cobalt particles, wherein about 5% to about 50% by weight of the carbide phase comprises the super dense tungsten carbide cobalt particles, and
a binder alloy comprising about 25% to about 50% by weight of the welded hardfacing composition.

6. The drill bit as defined in claim 5, wherein the carbide phase forms from about 64% to about 68% by weight of the welded hardfacing composition.

7. The drill bit as defined in claim 5, further comprising a deoxidizer in an amount of at most about 5% by weight of the welded hardfacing composition.

8. The drill bit as defined in claim 5, wherein the super dense tungsten carbide cobalt particles comprises about 10% to about 25% by weight of the carbide phase.

9. A welded hardfacing composition for a drill bit, comprising:
a carbide phase comprising from about 50% to about 75% by weight of the welded hardfacing composition, and wherein the carbide phase comprises a combination of 16 to 40 mesh cemented tungsten carbide, 40 to 80 mesh crushed cast tungsten carbide, 325 to 400 mesh carburized tungsten carbide, and 80 to 200 mesh super dense tungsten carbide cobalt particles, wherein about 5% to about 50% by weight of the carbide phase comprises the super dense tungsten carbide cobalt particles.

10. The welded hardfacing composition as defined in claim 9, wherein the carbide phase forms from about 64% to about 68% by weight of the welded hardfacing composition.

11. The welded hardfacing composition as defined in claim 9, wherein the super dense tungsten carbide cobalt particles comprises about 10% to about 25% by weight of the carbide phase.

12. The welded hardfacing composition as defined in claim 9, wherein the carbide phase further comprises at least one carbide selected from cast tungsten carbide, carburized tungsten carbide, and macrocrystalline tungsten carbide.

13. A roller cone drill bit, comprising:
a bit body; and
at least one roller cone rotatably mounted to the bit body, the at least one roller cone comprising at least one cutting element, the at least one cutting element having welded hardfacing composition welded on at least an exterior surface, the welded hardfacing composition comprising:
a carbide phase comprising from about 50% to about 75% by weight of the welded hardfacing composition, and wherein the carbide phase comprises a combination of 16 to 40 mesh cemented tungsten carbide, 40 to 80 mesh crushed cast tungsten carbide, 325 to 400 mesh carburized tungsten carbide, and 80 to 200 mesh super dense tungsten carbide cobalt particles, wherein about 5% to about 50% by weight of the carbide phase comprises the super dense tungsten carbide cobalt particles.

14. The drill bit as defined in claim 13, wherein the carbide phase forms from about 64% to about 68% by weight of the welded hardfacing composition.

15. The drill bit as defined in claim 13, wherein the welded hardfacing composition further comprises a deoxidizer in an amount of at most about 5% by weight of the welded hardfacing composition.

16. The drill bit as defined in claim 13, wherein the super dense tungsten carbide cobalt particles comprises about 10% to about 25% by weight of the carbide phase.

17. A method for forming a drill bit comprising:
welding a hardfacing to at least one of a plurality of teeth in the drill bit wherein the welded hardfacing comprises a carbide phase comprising from about 50% to about 75% by weight of the welded hardfacing composition, and wherein the carbide phase comprises a combination of 16 to 40 mesh cemented tungsten carbide, 40 to 80 mesh crushed cast tungsten carbide, 325 to 400 mesh carburized tungsten carbide, and 80 to 200 mesh super dense tungsten carbide cobalt particles, wherein about 5% to about 50% by weight of the carbide phase comprises the super dense tungsten carbide cobalt particles.

18. The method as defined in claim 17, wherein the carbide phase forms from about 64% to about 68% by weight of the welded hardfacing composition.

19. The method as defined in claim 17, wherein the welded hardfacing composition further comprises a deoxidizer in an amount of at most about 5% by weight of the welded hardfacing composition.

20. The method as defined in claim 17, wherein the super dense tungsten carbide cobalt particles comprises about 10% to about 25% by weight of the carbide phase.

* * * * *

UNITED STATES PATENT AND TRADEMARK OFFICE
CERTIFICATE OF CORRECTION

PATENT NO. : 7,666,244 B2  Page 1 of 1
APPLICATION NO. : 11/175120
DATED : February 23, 2010
INVENTOR(S) : Gregory T. Lockwood et al.

It is certified that error appears in the above-identified patent and that said Letters Patent is hereby corrected as shown below:

In the Claims:

In Claim 13, Column 10, Line 9, the word "cuffing" should read --cu__tt__ing--.

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,666,244 B2 Page 1 of 1
APPLICATION NO. : 11/175120
DATED : February 23, 2010
INVENTOR(S) : Lockwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Twenty-eighth Day of December, 2010

David J. Kappos
*Director of the United States Patent and Trademark Office*